United States Patent
Han et al.

(10) Patent No.: US 7,085,073 B1
(45) Date of Patent: Aug. 1, 2006

(54) AUTOMATIC FOCUSING METHOD FOR DIGITAL IMAGE PROCESSING APPARATUS

(75) Inventors: Yeong-soo Han, Seongnam-si (KR); Sung-woo Kim, Changwon-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 0 days.

(21) Appl. No.: 11/220,495

(22) Filed: Sep. 7, 2005

(30) Foreign Application Priority Data

May 20, 2005 (KR) .................. 10-2005-0042570

(51) Int. Cl.
*G02B 15/14* (2006.01)
(52) U.S. Cl. ...................... 359/698; 359/690
(58) Field of Classification Search .......... 359/684, 359/686, 687, 676, 689
See application file for complete search history.

(56) References Cited

U.S. PATENT DOCUMENTS 5,587,842 A * 12/1996 Iijima et al. ............... 359/698
2004/0119876 A1 6/2004 Ohmori et al.

* cited by examiner

*Primary Examiner*—Timothy Thompson
*Assistant Examiner*—Jerry Fang
(74) *Attorney, Agent, or Firm*—Gardner Carton & Douglas LLP

(57) ABSTRACT

Provided is an automatic focusing method used by a digital image processing apparatus including a zoom lens moving in a moving range of a first guide bar and a focus lens moving in a moving range of a second guide bar disposed on an extension of the first guide bar. The method includes performing focusing while moving the zoom lens in a range from a zooming limit position in the first guide bar to a set zoom limit position, if a current photographing mode is a close-range photographing mode and a current position of the zoom lens is the zooming limit position.

13 Claims, 6 Drawing Sheets

AUTOMATIC FOCUSING METHOD FOR DIGITAL IMAGE PROCESSING APPARATUS

CROSS-REFERENCE TO RELATED PATENT APPLICATIONS

This application claims the priority of Korean Patent Application No. 10-2005-0042570, filed on May 20, 2005, in the Korean Intellectual Property Office, the disclosure of which is incorporated herein in its entirety by reference.

BACKGROUND OF THE INVENTION

1. Field of the Invention

The present invention relates to an automatic focusing method for a digital image processing apparatus, and more particularly, to an automatic focusing method for a digital image processing apparatus that includes a zoom lens and a focus lens and performs automatic focusing by moving the zoom lens when the focus lens is positioned at an endpoint of its movable range.

2. Description of the Related Art

One example of a conventional image processing apparatus is disclosed in U.S. Patent Publication No. 20040119876 entitled "Method of Notification of Inadequate Picture Quality". As disclosed, the subject image processing apparatus includes a zoom lens and a focus lens, and performs automatic focusing.

Most users want better-performing and, for easy portability, smaller digital image processing apparatuses. One key to realizing smaller digital image processing apparatuses is to reduce the size (e.g., a length) of an optical system (e.g., lens barrel or the like) determined by moving ranges of a zoom lens and a focus lens.

SUMMARY OF THE INVENTION

The present invention provides an automatic focusing method for a digital image processing apparatus, the method effectively expanding a focusing range without expanding a moving range of a focus lens, thereby effectively reducing a length of an optical system lens barrel.

According to an aspect of the present invention, there is provided an automatic focusing method for a digital image processing apparatus that includes a zoom lens moving along a first guide bar in a zoom range having an upper and lower zoom limit and a focus lens moving along a second guide bar that is disposed on an extension of the first guide bar, the focus lens moving in a in a focus range having an upper and lower focus limit. The method includes performing focusing while moving the zoom lens in the zoom range along the first guide bar to a set zoom lens position, if a current photographing mode is a close-range photographing mode and a current position of the zoom lens is the zooming limit position.

In the automatic focusing method, when the current photographing mode is the close-range photographing mode and the current position of the zoom lens is the zoom range upper limit position, focusing is performed using the zoom lens in a micro-range from the zoom range upper limit position to a new focus setting zoom lens position while maintaining the focus lens in a stationary position. Accordingly, a focusing range of the focus lens can be expanded although a moving range of the focus lens remains unchanged. Consequently, a length of an optical system lens barrel can be effectively reduced.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art.

Figure 1:
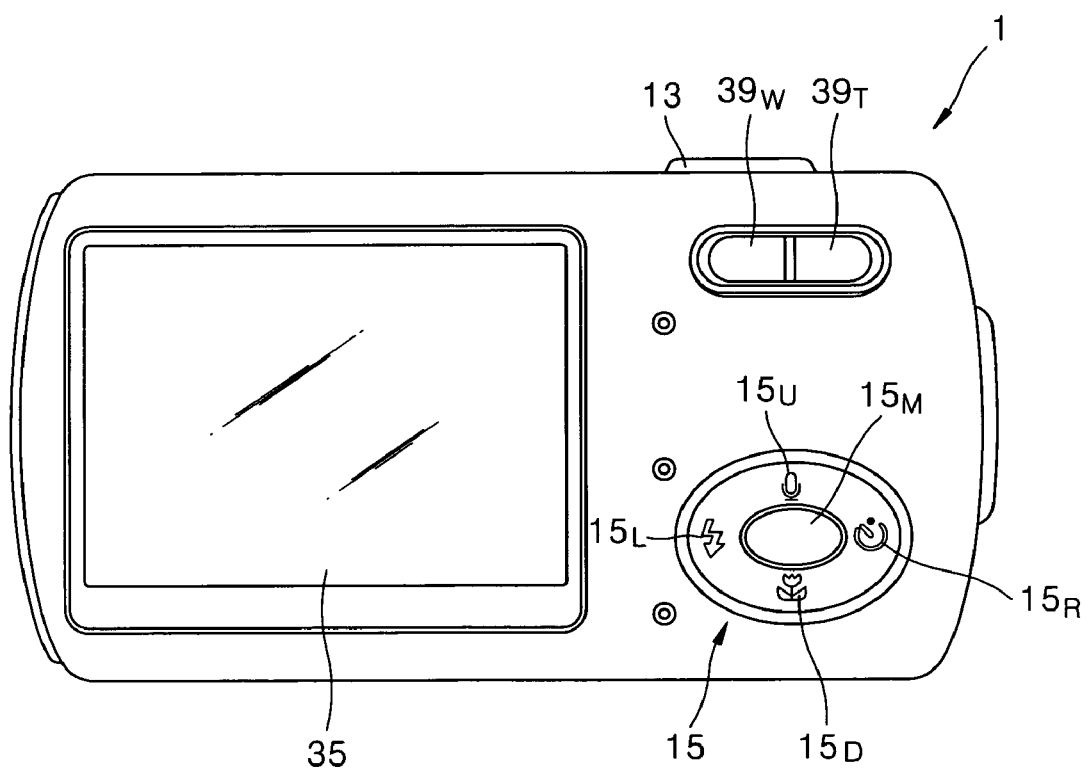
FIG. 1 is a view illustrating the back of a digital camera according to an embodiment of the present invention.

Referring to FIG. 1, a digital image processing apparatus according to the present invention is embodied as a digital camera 1 and includes a shutter release button 13, functional buttons 15, a color LCD panel 35, a wide-angle zoom button $39_W$, and a telephoto-zoom button $39_T$. Of course, although not illustrated, the digital camera 1 also includes a processor, a memory, a power source and other camera elements known in the art.

When a user presses the shutter release button 13, a photographing operation is performed that includes an automatic focusing operation.

The functional buttons 15 are used for operating specific functions of the digital camera 1 and are also used as control buttons to manage the movement of an active cursor that is displayed on, for example, a menu screen of the color LCD panel 35. The functional buttons 15 include a self-timer/right button $15_R$, a flash/left button $15_L$, a macro/down button $15_D$, a voice-memo/up button $15_U$, and a menu/select-confirm button $15_M$.

Figure 2:
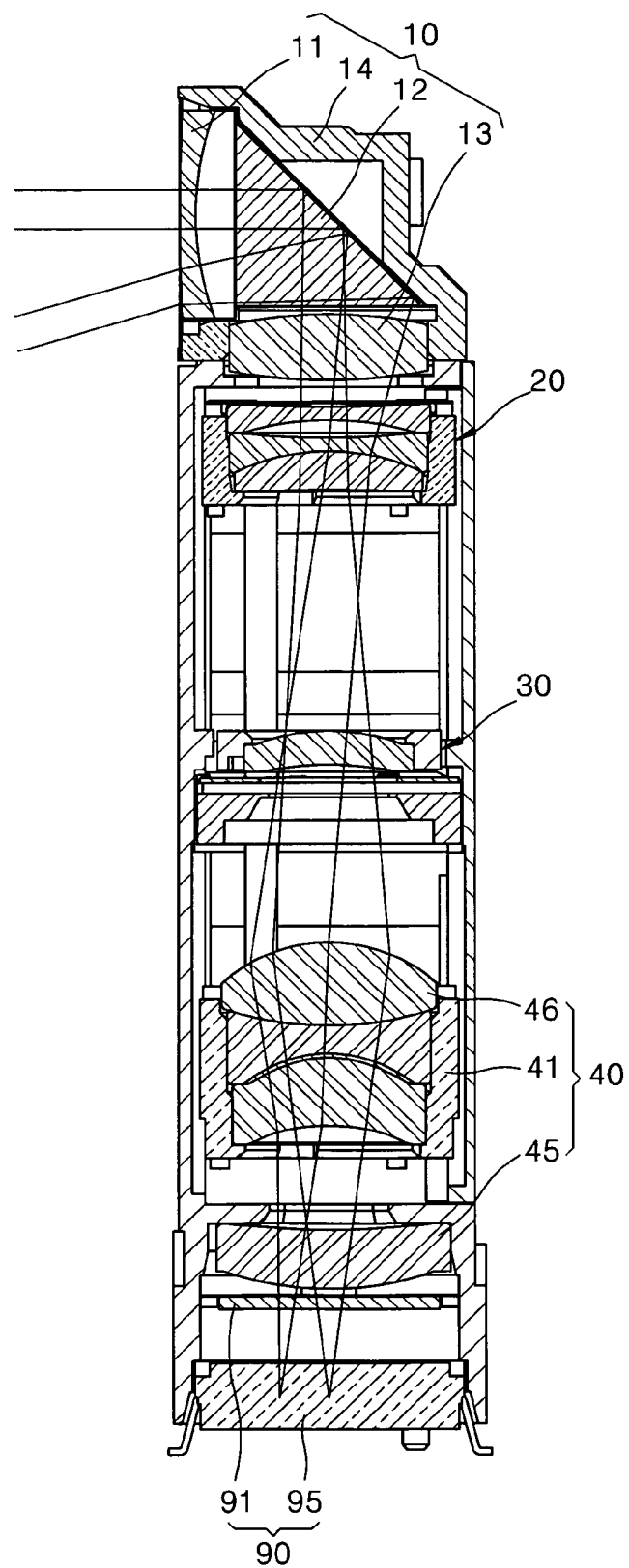
FIG. 2 is a cross-sectional view illustrating an internal configuration of an optical system (OPS)-barrel module included in the digital camera 1 of FIG. 1 and optical paths therethrough.

When the user presses the wide angle-zoom button $39_W$ or the telephoto-zoom button $39_T$, a zoom motor is driven, which in turn, moves a zoom lens. FIG. 2 is a cross-sectional view illustrating an example internal configuration of an optical system (referred to hereinafter as OPS-barrel module) included in the digital camera 1 of FIG. 1 and optical paths therethrough.

Referring to FIG. 2, the OPS-barrel module includes a first lens assembly 10 that is slanted and has a positive refractive power, a second lens assembly 20 that performs a zooming operation and has a negative refractive power, a third lens assembly 30 that has a positive refractive power, a fourth lens assembly 40 that performs a focusing operation and has a positive refractive power, and a photoelectric conversion unit (OEC) 90.

The first lens assembly 10 includes a first lens barrel 14, a G1 lens 11, a G3 lens 13, and a prism 12. The first lens barrel 14 includes a front aperture that is configured on a housing of the camera 1 to be facing a subject and a side aperture that is perpendicular to the front aperture. The G1 lens 11 is installed in the front aperture of the first lens barrel 14. The G3 lens 13 is installed in the side aperture of the first lens barrel 14. The prism 12 diverts light incident on the G1 lens 11 to a right angle toward the G3 lens 13.

The fourth lens assembly 40, i.e., a focus lens, includes a lens barrel 41 and a plurality of lenses including lenses 45 and 46. Similarly, the second lens assembly 20, i.e., a zoom lens, includes a lens barrel and a plurality of lenses. The third lens assembly 30, i.e., an auxiliary lens, includes a lens barrel and a fixed lens.

The OEC 90 includes an optical low pass filter (LPF) 91 and a charge coupled device (CCD) 95. The CCD 95 converts light passing through lenses 10, 20, 30, 40 into an electrical signal and may be embodied by a complementary metal oxide semiconductor (CMOS) or the like.

In the digital camera 1, magnification of an image incident on the OPS-barrel module is determined according to a position of the second lens assembly 20 as the zoom lens and a focal distance according to a position of the fourth lens assembly 40 as the focus lens. Therefore, a main controller (e.g., a microprocessor, DSP or the like) of the digital camera 1 can obtain the focal distance according to the position of the fourth lens assembly 40 relative to known design data for the OPS-barrel. The focal distance according to the position of the fourth lens assembly 40 may be set differently according to the position of the second lens assembly 20 (see FIG. 4).

Referring to FIGS. 1 and 2, when the user presses the wide-angle zoom button $39_W$, a focal distance becomes short and the angle of view becomes wider, thereby decreasing the image magnification. Accordingly, a focusing range of the fourth lens assembly 40 as the focus lens becomes narrower (see FIG. 4).

Conversely, when the user presses the telephoto-zoom button $39_T$, the focal distance becomes longer and the angle of view becomes narrower, thereby increasing the image magnification. Accordingly, the focusing range of the fourth lens assembly 40 as the focus lens becomes wider (see FIG. 4).

In an automatic focusing mode, the fourth lens assembly 40, i.e., the focus lens, moves in a moving range set according to a current position of the second lens assembly 20, i.e., the zoom lens. That is, the focus lens is adjusted after the zoom lens magnification is set. Thus, as can be appreciated from FIG. 4, which will be discussed hereinafter in further detail, after the zoom lens is set in a position to give a desired magnification, the focus lens is constrained to move in a range relative to the set position of the zoom lens. In this process, the position of the fourth lens assembly 40 that provides a largest high frequency component of an input image signal is applied as a focal position.

In the automatic focusing mode, if a current position of the second lens assembly 20, i.e., the zoom lens, is a zooming limit position and a current photographing mode is a close-range photographing mode such that the fourth lens assembly 40, i.e., the focus lens, is set at a close-range focusing position at an end of its movable range, focusing can still be performed using the second lens assembly 20 in a micro-range from the zooming limit position. Therefore, even when the moving range of the fourth lens assembly 40, i.e., the focus lens, remains unchanged, a focusing range can be expanded. Thus, by moving the second lens assembly 20 for focusing when the fourth lens assembly 40 is at an end of its movable range, the length of the OPS-barrel can effectively be reduced. An automatic focusing technology and method will now be described in detail with reference to FIGS. 3 through 7.

Figure 3:
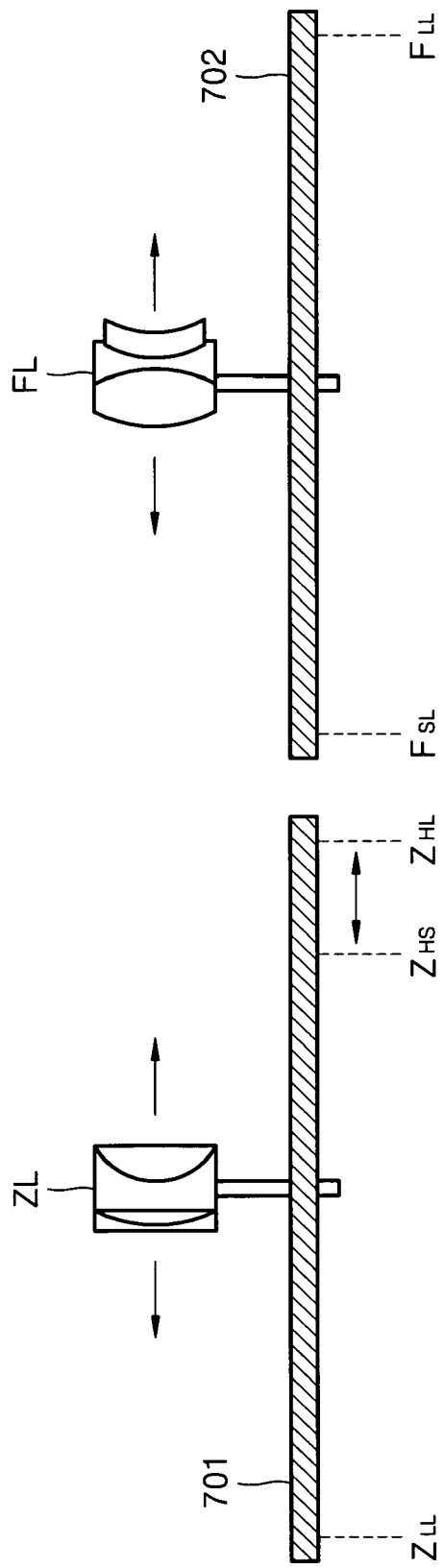
FIG. 3 shows driving states of a zoom lens and a focus lens of the digital camera of FIG. 1 to illustrate an automatic focusing algorithm performed during a photographing operation.
Figure 4:
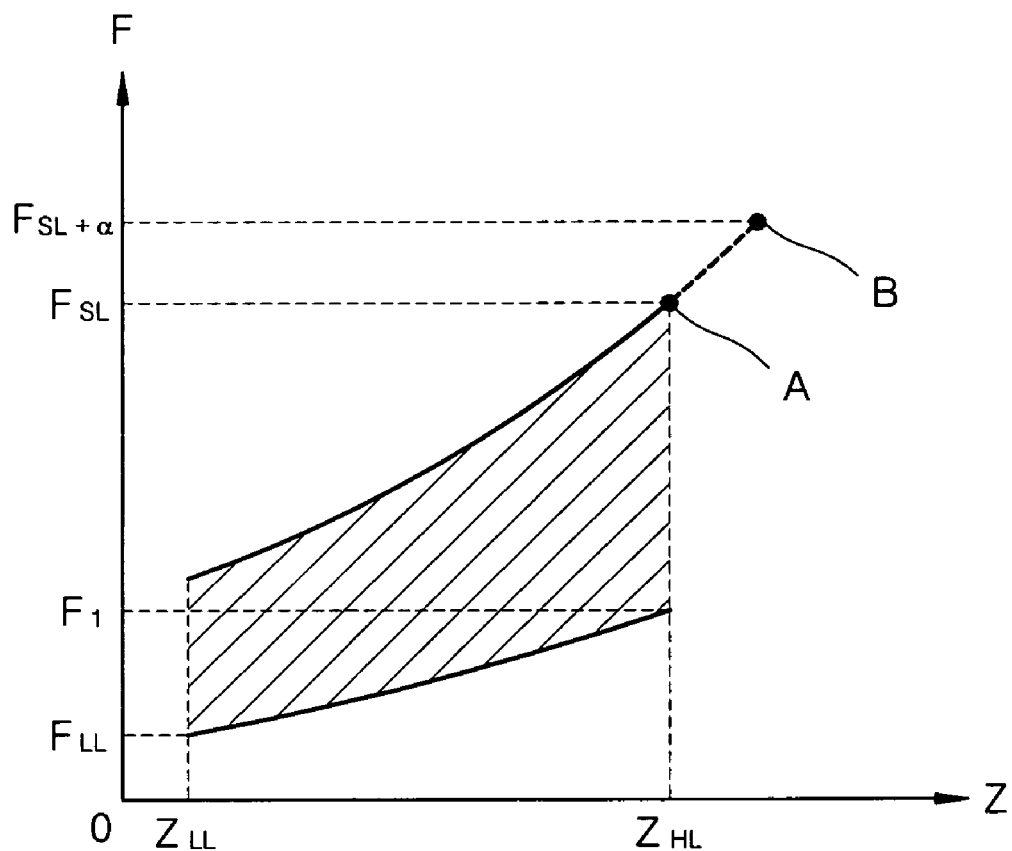
FIG. 4 is a graph illustrating a focusing range of the focus lens of FIG. 3 corresponding to each position of the zoom lens to illustrate the automatic focusing algorithm performed during the photographing operation of the digital camera of FIG. 1.

FIG. 3 illustrates driving states of a zoom lens ZL, i.e., the second lens assembly 20, and a focus lens FL, i.e., the fourth lens assembly 40, of FIG. 2 in order to illustrate an automatic focusing algorithm performed during the photographing operation of the digital camera 1 of FIG. 1. FIG. 4 illustrates a focusing range of the focus lens FL of FIG. 3 corresponding to each position of the zoom lens ZL to illustrate the automatic focusing algorithm performed during the photographing operation of the digital camera 1 of FIG. 1.

In FIGS. 3 and 4, reference numeral 701 indicates a first guide bar along which the zoom lens ZL travels and reference numeral 702 indicates a second guide bar disposed on an extension of the first guide bar 701 along which the focus lens FL travels. As can be appreciated, the zoom lens ZL moves along the first guide bar 701 in a movable range defined by endpoint positions $Z_{LL}$ and $Z_{HL}$. Reference label $Z_{LL}$ indicates a position for zoom lens ZL on the first guide bar 701 at which the zoom lens ZL provides a minimum magnification in a moving range of the first guide bar 701. Reference numeral $Z_{HL}$ indicates a position for zoom lens ZL on the first guide bar 701 at which the zoom lens ZL provides a maximum magnification in a moving range of the first guide bar 701. Reference numeral $Z_{HS}$ indicates a position in which the zoom lens ZL is set before an automatic focusing operation is performed.

As can be appreciated, the focus lens FL moves along the second guide bar 702 in a movable range defined by endpoint positions $F_{LL}$ and $F_{SL}$. Reference label $F_{LL}$ indicates a position for focus lens FL on the second guide bar 702 for providing a longest focal distance and reference label $F_{SL}$ indicates a focusing limit position at which the focus lens FL is set when the position of the zoom lens ZL is the zooming limit position and the current photographing mode is the close-range photographing mode. In other words, reference numeral $F_{SL}$ indicates a focus lens position having a shortest focal distance in the moving range of the second guide bar 702.

Referring to FIGS. 1 through 4, when the user presses the wide angle-zoom button $39_W$ or the telephoto-zoom button $39_T$, the zoom lens ZL moves in the moving range $Z_{LL}$ through $Z_{HL}$ of the first guide bar 701.

When the user presses the telephoto-zoom button $39_T$, the zoom lens ZL moves toward the zooming limit position $Z_{HL}$. Accordingly, the focal distance becomes longer and the angle of view becomes narrower, thereby increasing the image magnification. In this case, the focusing range of the focus lens FL becomes wider. For example, as shown in FIG. 4, when the zoom lens ZL is at the zooming limit position $Z_{HL}$, the focusing range (i.e., the vertical space between the upper and lower curves at the $Z_{HL}$ position) for the focus lens FL is $F_1$ through $F_{SL}$.

Conversely, when the user presses the wide-angle zoom button $39_W$, the zoom lens ZL moves to the position of the minimum magnification $Z_{LL}$. Accordingly, the focal distance becomes shorter and the angle of view becomes wider, thereby decreasing the image magnification. In this case, the focusing range (i.e., the vertical space between the upper and lower curves at the $Z_{LL}$ position) is smaller by inspection than the foregoing-mentioned focusing range of the zoom lens ZL when it is positioned at $Z_{HL}$.

As described above, in the automatic focusing mode, the focus lens FL moves in a moving range that is determined relative to a current position of the zoom lens ZL. In this process, a position of the focus lens FL, for example, a number of driving steps of a focus motor (e.g., a stepper motor or the like that drives the location of fourth lens module 40) is determined such that the high frequency component of an input image signal is maximized and that location is applied as the focal position.

If the current position of the zoom lens ZL is the zooming limit position $Z_{HL}$ and the current photographing mode is the close-range photographing mode, that is, if the position of the focus lens FL corresponding to the close-range photographing mode is the focusing limit position $F_{SL}$ (point A in FIG. 4), focusing is performed using the zoom lens ZL in a range from the zooming limit position $Z_{HL}$ to the set zoom lens position $Z_{HS}$.

In other words, when a focusing search range is wider than a movable range $F_{LL}$ through $F_{SL}$ of the focus lens FL, the main controller performs focusing using the zoom lens ZL while moving the zoom lens ZL. Referring to FIG. 4, after focusing is performed using the zoom lens ZL, the point moves up from "A" to "B". Accordingly, although the movable range $F_{LL}$ through $F_{SL}$ of the focus lens FL remains unchanged, the focusing range can be expanded to a range from $F_{LL}$ to $F_{SL+\alpha}$. Therefore, the length of the OPS-barrel module can be effectively reduced.

The image magnification at set zoom lens position $Z_{HS}$ does not differ substantially from the maximum image magnification at the zooming limit position $Z_{HL}$. Experimentally, when the zoom lens ZL is set at position $Z_{LL}$, which is the position of the zoom lens ZL providing the minimum magnification, the zoom lens was 0.1 mm (8 driving steps) from the origin. Further, the zooming limit position $Z_{HL}$ was 8.4 mm (670 driving steps) from the origin and the focusing limit position $F_{SL}$, which corresponds to the close-range photographing mode when the zoom lens position is set at an end ($Z_{HL}$) of its movable range, was 5.0 mm (500 driving steps) from the origin, the appropriate set zoom lens position for focusing $Z_{HS}$ was 6.9 mm (550 driving steps) from the origin. In this case, after focusing was performed using the zoom lens ZL in the range from the zooming limit position $Z_{HL}$ to the set zoom lens position $Z_{HS}$, a new focusing limit position $F_{SL+\alpha}$ of the focus lens FL could be obtained. Here, the new focusing limit position $Z_{HS}$ was 6.0 mm (610 driving steps) from the origin, which is a somewhat negligible difference of 0.9 mm and 60 driving steps from the previous zoom lens position.

Therefore, through focusing by moving the zoom lens from $Z_{HL}$ to $Z_{HS}$, it can be understood that the focusing range was expanded by 1.0 mm to the range from $F_{SL}$ to $F_{SL+\alpha}$ (FIG. 4) although the movable range ($F_{LL}$ through $F_{SL}$) of the focus lens FL remained unchanged. Accordingly, the length of the OPS-barrel can effectively be reduced.

Figure 5:
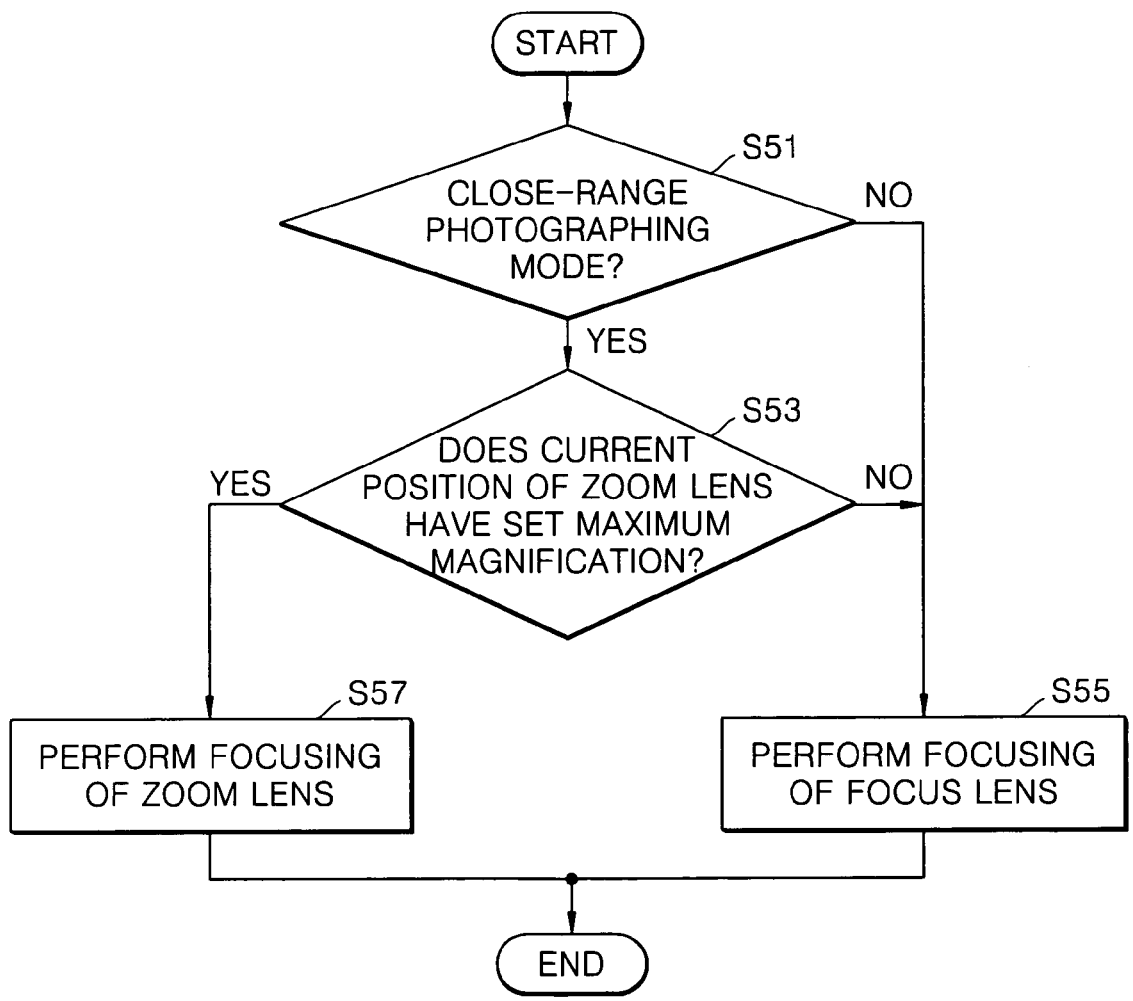
FIG. 5 is a flowchart illustrating the automatic focusing algorithm performed during the photographing operation of the digital camera of FIG. 1.
Figure 6:
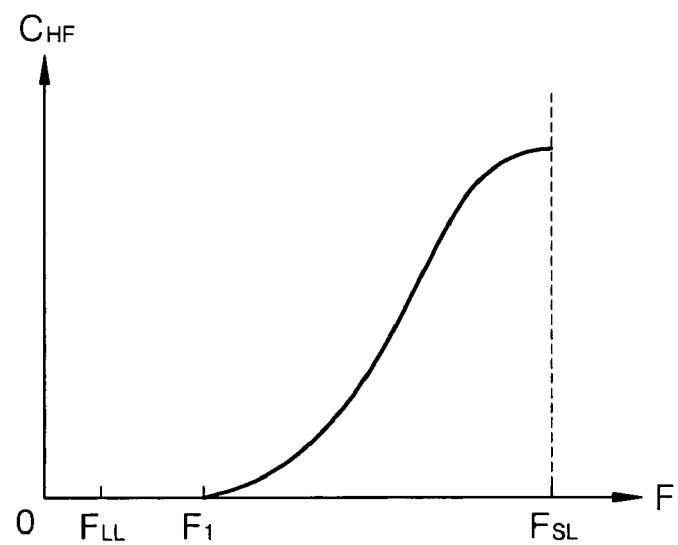
FIG. 6 is a focusing graph obtained after operations S51 and S53 of FIG. 5 are performed when a current position of the zoom lens is a zooming limit position in a first guide bar and a subject is at a set close range.
Figure 7:
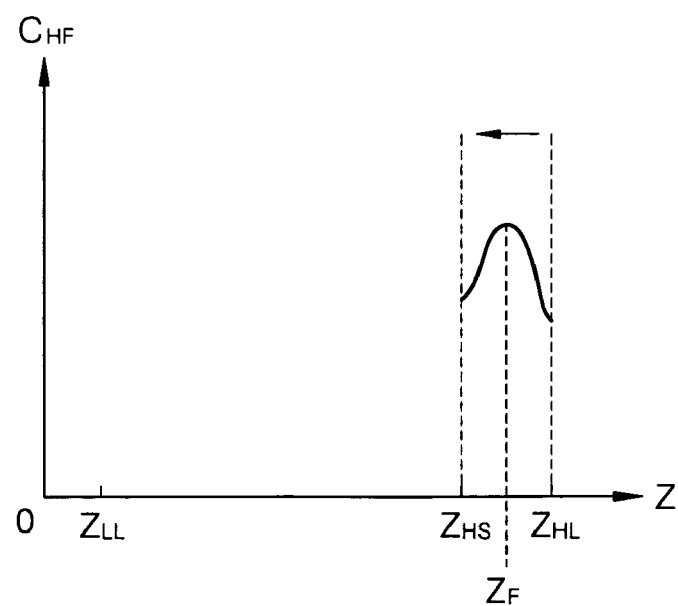
FIG. 7 is a focusing graph obtained after focusing is performed using the zoom lens in operation S57 of FIG. 5.

FIG. 5 is a flowchart illustrating the automatic focusing algorithm performed during the photographing operation of the digital camera 1. FIG. 6 is a focusing graph obtained after operations S51 and S53 of FIG. 5 are performed when the current position of the zoom lens ZL is the zooming limit position $Z_{HL}$ in the first guide bar 701 and a subject is at a set close range. FIG. 7 is a focusing graph obtained after focusing is performed using the zoom lens ZL in operation S57 of FIG. 5.

In FIGS. 6 and 7, like reference numerals to those in FIGS. 3 and 4 denote like elements. In FIGS. 6 and 7, reference numeral $C_{HF}$ denotes an amount of high frequency components of an input image signal. The automatic focusing algorithm of FIG. 5 will be described step by step with reference to FIGS. 3 through 7.

In step S51, the main controller (e.g., a digital camera processor, DSP, microprocessor or the like) of the digital camera 1 determines whether the current photographing mode is the close-range photographing mode. When not in the close-range photographing mode, the focusing range of the focus lens FL is within the movable range $F_{LL}$ through $F_{SL}$. Thus, the main controller performs focusing using the focus lens FL within the movable range $F_{LL}$ through $F_{SL}$ relative to the current position of the zoom lens ZL (S55). More specifically, the main controller sets the position of the focus lens FL so that the high frequency component of an input image signal is maximized. As shown in FIG. 6, the high frequency component $C_{HF}$ is maximized when the focus lens FL is set at position $F_{SL}$. Further as shown in FIG. 7, the FL is fixed in a position $F_{SL}$ for close-range photographing and the zoom lens ZL is moved to the position $Z_F$ so that the high frequency component $C_{HF}$ of an input image signal is maximized However, in step S51 when the main controller determines that the digital camera 1 is set in the close-range photographing mode, the main controller then determines in step S53 whether the current position of the zoom lens ZL is the position having a set maximum magnification, i.e., the zooming limit position $Z_{HL}$ in the first guide bar 701.

If in step S53 the current position of the zoom lens ZL is not the position having the set maximum magnification, i.e., the zooming limit position $Z_{HL}$, the focusing range of the focus lens FL is within the movable range $F_{LL}$ through $F_{SL}$ of the focus lens FL. Therefore, the main controller performs focusing using the focus lens FL within the focusing range of the focus lens FL corresponding to the current position of the zoom lens (S55).

When the current photographing mode is the close-range photographing mode and the current position of the zoom lens ZL is the position having the set maximum magnification, i.e., the zooming limit position $Z_{HL}$, the focusing range $F_{LL}$ through $F_{SL+\alpha}$ of the focus lens FL is wider than the movable range $F_{LL}$ through $F_{SL}$ of the focus lens FL (see FIGS. 4 and 6). Therefore, the main controller performs focusing using the zoom lens ZL in the range from the zooming limit position $Z_{HL}$ to the set zoom lens position $Z_{HS}$(S57). More specifically, the main controller sets the position of the zoom lens ZL having the largest high frequency component of an input image signal as the focal position $Z_F$ of the zoom lens ZL.

As described above, in an automatic focusing method used by a digital image processing apparatus according to the present invention, when a photographing mode is a close-range photographing mode and a current position of a zoom lens is a zooming limit position, focusing is performed using the zoom lens in a micro-range from the zooming limit position to a set zoom lens position. Accordingly, a focusing range can be expanded although a moving range of a focus lens remains unchanged. Consequently, a length of an OPS-barrel can be effectively reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for focusing a digital image processing apparatus including a zoom lens that moves along a first guide bar and a focus lens that moves along a second guide bar that is adjacent with the first guide bar in a direction, the method comprising:
   a) determining if the digital image processing apparatus is set for close-range photographing, comprising the steps:
      (i) detecting a position of the focus lens; and
      (ii) determining if the position of the focus lens is substantially similar to an end of the second guide bar proximate the first guide bar;
   b) if a close-range photographing setting is determined in step a), determining an image magnification level; and
   c) if the image magnification level in step b) is determined to be maximal, maintaining the focus lens in a stationary position and moving the zoom lens relative to the focus lens.

2. The method of claim 1 wherein the detecting step comprises counting a number of steps of a driving motor that moves the focus lens along the second guide bar.

3. A method for focusing a digital image processing apparatus including a zoom lens that moves along a first guide bar and a focus lens that moves along a second guide bar that is adjacent with the first guide bar in a direction, the method comprising:
   a) determining if the digital image processing apparatus is set for close-range photographing;
   b) if a close-range photographing setting is determined in step a), determining an image magnification level, comprising the steps:
      (i) detecting a position of the zoom lens; and
      (ii) determining if the position of the zoom lens is substantially similar to an end of the first guide bar proximate the second guide bar; and
   c) if the image magnification level in step b) is determined to be maximal, maintaining the focus lens in a stationary position and moving the zoom lens relative to the focus lens.

4. The method of claim 3 wherein the detecting step comprises counting a number of steps of a driving motor that moves the zoom lens along the first guide bar.

5. A method for focusing a digital image processing apparatus including a zoom lens that moves along a first guide bar and a focus lens that moves along a second guide bar that is adjacent with the first guide bar in a direction, the method comprising:
   a) determining if the digital image processing apparatus is set for close-range photographing;
   b) if a close-range photographing setting is determined in step a), determining an image magnification level; and
   c) if the image magnification level in step b) is determined to be maximal, maintaining the focus lens in a stationary position and moving the zoom lens relative to the focus lens, comprising the steps:
      (i) driving a motor through a plurality of incremental steps to move the zoom lens;
      (ii) measuring a level of a high frequency component of the image at each of the plurality of incremental steps;
      (iii) relative to the measuring step, determining a maximum level of the high frequency component; and
      (iv) positioning the zoom lens at one step of the plurality of incremental steps at which the maximum level of the high frequency component was measured.

6. A method for focusing a digital image processing apparatus including a first lens assembly having positive refractive power, a second lens assembly having a negative refractive power and being movable along a first guide bar for zooming an image, a third lens assembly having a positive refractive power, and a fourth lens assembly having a positive refractive power and being movable along a second guide bar for focusing the image, the method comprising:
   a) detecting a position of the fourth lens assembly;
   b) determining if the position of the fourth lens assembly is substantially similar to an end of the second guide bar proximate the first guide bar;
   c) detecting a position of the second lens assembly;
   d) if the position of the second lens assembly in step c) is determined to be substantially similar to an end of the first guide bar proximate the second guide bar, fixing the position of the fourth lens assembly and moving the second lens assembly away from the position of the fourth lens assembly.

7. The method of claim 6 wherein step a) comprises counting a number of steps of a driving motor that moves the fourth lens assembly along the second guide bar.

8. The method of claim 6 wherein step c) comprises counting a number of steps of a driving motor that moves the second lens assembly along the first guide bar.

9. The method of claim 6 wherein step d) comprises:
   driving a motor through a plurality of incremental steps for moving the moving the second lens assembly;
   measuring a level of a high frequency component of the image at each of the plurality of steps;
   relative to the measuring step, determining a maximum level of the high frequency component; and
   positioning the second lens assembly at one step of the plurality of incremental steps at which the maximum level of the high frequency component was measured.

10. A method for focusing a digital camera including a first lens assembly having positive refractive power, a second lens assembly having a negative refractive power and being driven along a first guide bar by a first motor for zooming an image, a third lens assembly having a positive refractive power, and a fourth lens assembly having a positive refractive power and being driven along a second guide bar by a second motor for focusing the image, the method comprising:
   a) detecting a position of the fourth lens assembly along the second guide bar;
   b) determining if the position of the fourth lens assembly is substantially similar to an end of the second guide bar proximate the first guide bar;
   c) detecting a position of the second lens assembly;
   d) if the position of the second lens assembly in step c) is determined to be substantially similar to an end of the first guide bar proximate the second guide bar, deactuating the second motor to fix the position of the fourth lens assembly and actuating the first motor to move the second lens assembly relative to the position of the fourth lens assembly along a predetermined end portion of the first guide bar proximate the second guide bar.

11. The method of claim 10 wherein step a) comprises counting a number of steps of the second motor.

12. The method of claim 10 wherein step c) comprises counting a number of steps of the first motor.

13. The method of claim 10 wherein step d) comprises:
driving the first motor through a plurality of incremental steps comprising the predetermined end portion;
measuring a level of a high frequency component of the image at each of the plurality of incremental steps;
relative to the measuring step, determining a maximum level of the high frequency component; and
positioning the second lens assembly at one step of the plurality of incremental steps at which the maximum level of the high frequency component was measured.

\* \* \* \* \*